Oct. 28, 1952          C. E. DEARDORFF ET AL          2,615,433
                       HYDRAULIC CONTROL UNIT
                       Filed Aug. 17, 1948
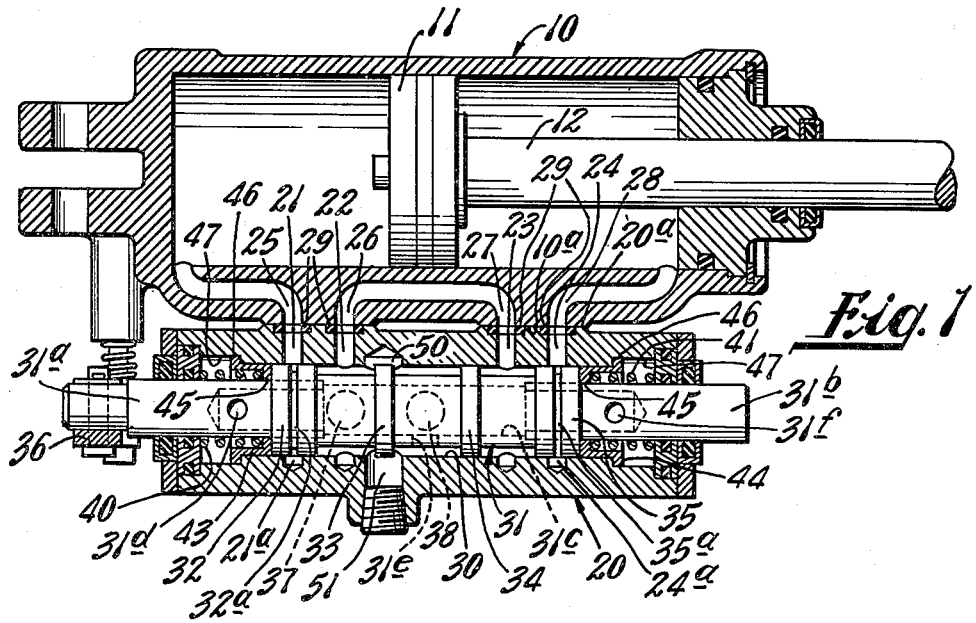
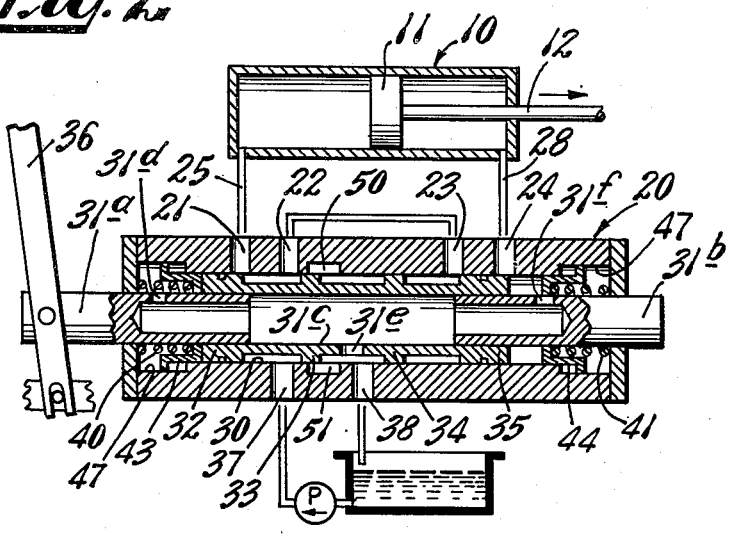
INVENTORS
ALVIN A. MEDDOCK
AND CLINTON E. DEARDORFF
BY
ATTORNEY Patented Oct. 28, 1952

2,615,433

UNITED STATES PATENT OFFICE 2,615,433

HYDRAULIC CONTROL UNIT

Clinton E. Deardorff, San Fernando, and Alvin A. Meddock, North Hollywood, Calif., assignors to Bendix Aviation Corporation, South Bend, Ind., a corporation of Delaware Application August 17, 1948, Serial No. 44,606

10 Claims. (Cl. 121—46.5)

This invention relates to control valves for controlling hydraulic motors, and represents an improvement on the valve disclosed in our copending application Serial No. 5,798, filed February 2, 1948.

An object of the invention is to provide a control valve that is spring-restored to neutral position, but that after being moved from neutral into operating position, is held in operating position by hydraulic pressure until the valve is either forceably restored, or the motor reaches the limit of its movement and stops.

A more specific object is to obtain the foregoing action substantially independently of the rate of fluid flow through the valve.

Another object is to obtain the foregoing action with a simple and practicable mechanism.

Briefly, our prior application discloses a piston valve having a neutral central position with centering springs at opposite ends of the piston, and fluid connections such that when the valve is shifted out of neutral position in either direction to actuate the motor, the exhaust fluid from the motor is directed through a restricted passage to produce a pressure drop, which pressure drop is applied to such end of the piston as to oppose the restoring force of the centering springs. Since the pressure drop across a restriction varies with the rate of flow, the initial opening of the valve must exceed a certain minimum in order for the valve to hold open.

The present invention reduces this minimum opening at which the valve will "hold" by substituting, for the fixed restriction, a spring-closed valve acting as a variable constriction to maintain a substantially constant holding pressure on the valve for all rates of fluid flow through the motor. Further, in accordance with the invention, the spring-closed valve is combined with the valve restoring structure so that the same springs are used on both, thereby effecting both simplification and economy.

A full understanding of the invention may be had from the following description, with reference to the drawing, in which:

Fig. 1 is a longitudinal, sectional view through a hydraulic jack equipped with a control valve, in accordance with the invention, the valve being shown in neutral position; and Fig. 2 is a schematic diagram showing the valve in operating position.

Referring to Fig. 1, there is shown a hydraulic motor in the form of a jack having a cylinder 10 containing a piston 11 having a piston rod 12 that extends through the right end of the cylinder 10.

The control valve in accordance with the invention is indicated at 20 and consists of a body that is clamped against a face 10a provided on the cylinder 10, the valve itself being provided with a corresponding face 20a. Various ports in the cylinder face 10a and in the valve body face 20a are provided to effect communication between the cylinder and the valve. Thus, ports 21, 22, 23 and 24 in the valve body communicate with ports 25, 26, 27 and 28 respectively in the cylinder. The cylinder ports 25 and 28 extend to opposite ends of the cylinder 10 for admitting and exhausting fluid to move the piston 11. The ports 26 and 27 in the jack cylinder merely communicate with each other to provide a convenient method of intercommunication between the two valve ports 22 and 23. Packing rings 29 effect seals between the valve body ports and the jack cylinder ports.

The valve body 20 defines a valve cylinder 30 containing a reciprocal piston valve 31 having lands 32, 33, 34 and 35 which seal with the cylinder wall 30. The lands 32 and 35 contain annular grooves 32a and 35a therein for the purpose of balancing the pressure forces thereon when the valve is in neutral position, as shown in Fig. 1. To make possible this balancing operation, small blind ports 21a and 24a are provided opposite the ports 21 and 24 respectively.

At its opposite ends, the valve piston 31 is provided with extensions 31a and 31b which extend through the ends of the valve body. The extension 31a is shown connected to an actuating lever 36. The opposite extension 31b is provided merely to effect pressure balance on the piston.

The cylinder 30 is provided with a pressure inlet port 37 and an exhaust port 38, and the piston 31 has a longitudinal passage 31c therein which communicates with three ports 31d, 31e and 31f in the side of the piston.

The piston is constantly urged into neutral position by a pair of helical compression springs 40 and 41, each of which is compressed between the adjacent valve cylinder end and a spring retainer 43 or 44, each of which has an inwardly extending flange 45 closely fitting the piston extension, and an outwardly extending flange 46 closely fitting in a counterbore 47 at the outer ends of the valve cylinder, so that it constitutes an auxiliary piston valve means, for a purpose that will appear from the description of operation.

The device operates as follows: When the valve is in neutral position, as shown in Fig. 1, pressure fluid enters through the inlet port 37, flows around the land 33 through blind ports 50 and 51 provided for that purpose, and out the exhaust port 38. At this time the ports 21 and 24 connected with opposite ends of the jack cylinder 10 are closed by the lands 32 and 35.

Let it be assumed that the jack piston 11 is to be moved to the right. To accomplish this the lever 36 (Fig. 2) is actuated to move the valve piston 31 to the left until the land 32 uncovers the port 21, and the land 33 closes off the blind ports 50 and 51. This movement also carries the land 35 to the left of port 24. Thereupon, pressure fluid entering through the pressure port 37 is blocked from flowing through the blind ports 50 and 51 to the exhaust port 38, and flows through the ports 21 and 25 into the left end of the jack cylinder 10, causing the latter to move to the right and exhaust fluid out through the ports 28 and 24, the latter being now uncovered by the land 35. The exhaust fluid flowing in through the port 24 lifts the auxiliary piston valve 44, compressing the spring 41 in so doing until the inner flange 45 uncovers the port 31f in the piston extension 31b. The fluid flows in through the port 31f and through the longitudinal passage 31c in the valve piston, and out through the port 31e which is in communication with the portion of the valve cylinder containing the exhaust port 38.

In order for the valve 44 to be lifted as described, the exhaust fluid must develop a certain predetermined minimum pressure determined by the area of the inner flange 45 and by the stiffness of the spring 41. This predetermined minimum pressure acts against the right end of the land 35, urging the valve piston to the left with sufficient force to overcome the spring 40 and hold the valve in fully opened position.

The valve can be closed manually at any time, since no great force on the lever 36 is required to overcome the force of the exhaust fluid that holds the valve open. Furthermore, if the jack piston 11 is stopped, as by reaching the end of its stroke, or by resistance to further movement applied to the piston rod 12, the residual fluid will leak past the unpacked flange 45 of the valve 44 and permit the piston to be restored by the opposite restoring spring 40.

If the lever 36 is moved to the right instead of to the left, the jack piston 11 is moved in the opposite direction. Thus the fluid flow can be traced from the valve inlet port 37 through the ports 22, 26, 27 and 23 into the valve cylinder and thence through the port 24 (now uncovered by the land 35) and the port 28 to the right end of the jack cylinder. Fluid exhausted from the left end of the jack cylinder through the ports 25 and 21 lifts the valve 43 sufficiently to escape through the piston port 31d into the piston passage 31c and out through the piston port 31e to the main exhaust port 38.

Although for the purpose of explaining the invention, a particular embodiment thereof has been shown and described, obvious modifications will occur to a person skilled in the art, and we do not desire to be limited to the exact details shown and described.

We claim:

1. A control valve for controlling flow of fluid to and from a hydraulic motor, said valve comprising: a valve cylinder and piston; means defining an exhaust passage connected to one end of said cylinder, and means defining a pressure port and motor ports intermediate the ends of said cylinder; said piston having lands for selectively controlling flow of fluid from said pressure port through said motor ports and through said one end of said cylinder to said exhaust passage; said piston lands, pressure port and motor ports being so positioned that movement of the piston away from said one end of the cylinder permits fluid flow through said motor ports to said cylinder end; auxiliary piston valve means in said cylinder interposed between said end of said cylinder and the adjacent end of said piston; a spring means interposed between said auxiliary piston means and said one end of said cylinder; said exhaust passage connecting with the cylinder through a port normally covered by said auxiliary piston valve means and adapted to be uncovered by movement of the auxiliary piston valve means in response to the pressure of the exhaust fluid flowing from one of said motor ports to said last mentioned port, said pressure acting against said spring.

2. A control valve according to claim 1 in which said valve piston has a piston rod extending therefrom through the said one end of said cylinder in sealing relation therewith; said exhaust passage extends through said piston rod and terminates in a port in said rod; and said auxiliary piston valve means comprises an annular piston surrounding said piston rod and movable to cover and uncover said piston rod port.

3. A control valve for controlling flow of fluid to and from a hydraulic motor, said valve comprising a valve cylinder and piston; means defining an exhaust passage connected to one end of said cylinder, and means defining a pressure port and motor ports intermediate the ends of said cylinder; said piston having lands for selectively controlling flow of fluid from said pressure port through said motor ports and through said one end of said cylinder to said exhaust passage; said piston lands, pressure port and motor ports being so positioned that movement of the piston away from said one end of the cylinder permits fluid flow through said motor ports to said one cylinder end; a pair of centering springs at opposite ends of said piston for urging said piston into a neutral position; auxiliary piston valve means in said cylinder at one end of said piston and reciprocable with respect thereto, said auxiliary piston valve means being interposed between one end of said piston and the adjacent centering spring; said exhaust passage connecting with the said one end of the cylinder through a port normally covered by said auxiliary piston valve means and adapted to be uncovered by movement of the auxiliary piston valve means in response to the pressure of exhaust fluid flowing from one of said motor ports to said last mentioned port.

4. A control valve for controlling flow of fluid to and from a hydraulic motor; said valve comprising: a valve cylinder and piston; means defining an exhaust passage connected to both ends of said cylinder, and means defining a pressure port and motor ports intermediate the ends of said cylinder; said piston having lands for selectively controlling flow of fluid from said pressure port into either motor port, and from the other motor port to one end of said cylinder and thence to said exhaust passage; said piston lands, pressure port, and motor ports being so positioned that movement of the piston away from a mid position in one direction permits fluid flow from the pressure port into one motor port, and from the other motor port to one end of said cylinder, and movement of said piston from said mid position toward the other end of said cylinder permits fluid flow from said pressure port into the other motor port, and from the one motor port to the one end of said cylinder; spring means for urging said piston into said mid position comprising a compression spring at each end of said piston; and pressure responsive means for variably resisting flow from each end of said cylinder into said exhaust passage for developing a pressure force on said piston assisting its movement away from said mid position, said pressure responsive means comprising an auxiliary valve piston within said cylinder at each end of said valve piston adapted to cover and uncover a port connected to said exhaust passage, said auxiliary valve pistons being urged toward said piston ends by said centering springs.

5. A valve according to claim 4 in which said valve piston has piston rods extending therefrom at each end through the opposite ends of said valve cylinder in sealing relation therewith; said piston rod has a passage connected to said exhaust passage, and said ports covered by said auxiliary valve pistons extend from said passage in said piston rods through the surfaces of said rods.

6. In combination: a hydraulic motor having two ports and movable through a limited range in response to delivery of fluid to one port and exhaust of fluid from the other port, and a self-holding control valve for said motor, said valve comprising: a valve cylinder and piston; means defining an exhaust passage terminating in an exhaust port communicating with said cylinder adjacent one end thereof, and means defining a pressure port and a pair of motor ports intermediate said exhaust port and the other end of said cylinder; said piston having a plurality of lands sealing with said cylinder, said lands, pressure port and motor port being so longitudinally positioned relative to each other that said motor ports are isolated by said lands from said pressure port and from said one end of said cyilnder in a first, neutral, position of said piston, and one of said motor ports is connected to said pressure port and the other motor port is connected to said one end of said cylinder in a second, power, position of said piston more remote from said one end of said cylinder than said neutral position; auxiliary piston valve means in said cylinder interposed between said one end of said cylinder and the adjacent end of said piston; spring means urging said auxiliary piston means toward said piston; said auxiliary piston means being movable by said spring means into position between said other motor port and said exhaust port for blocking flow therebetween and being oppositely movable by pressure sufficient to overcome the force of said spring, to open said exhaust port and permit flow of exhaust fluid thereinto while maintaining pressure against the adjacent end of said piston; and piston-restoring spring means urging said piston toward said one end of said cylinder in opposition to the force on the piston of exhaust fluid in said one end of said cylinder.

7. The combination claimed in claim 6 in which said means defining said exhaust passage and port comprises a piston rod extending from said piston through said one end of said cylinder in sealing relation therewith; and said auxiliary piston valve means comprises an annular piston surrounding said piston rod and movable to cover and uncover said exhaust port.

8. In combination: a hydraulic motor having two ports and movable through a limited range in response to delivery of fluid to one port and exhaust of fluid from the other port, and a self-holding control valve for said motor, said valve comprising: a valve cylinder and piston; means defining an exhaust passage terminating in an exhaust port communicating with said cylinder adjacent one end thereof, and means defining a pressure port and a pair of motor ports intermediate said exhaust port and the other end of said cylinder; said piston having a plurality of lands sealing with said cylinder, said lands, pressure port and motor ports being so longitudinally positioned relative to each other that said motor ports are isolated by said lands from said pressure port, and from said one end of said cylinder in a first, neutral, position of said piston, and one of said motor ports is connected to said pressure port, and the other is connected to said one end of said cylinder in a second power position of said piston more remote from said one end of said cylinder than said neutral position; a pair of centering springs at opposite ends of said piston for urging said piston into said neutral position; auxiliary piston valve means in said one end of the cylinder interposed between said piston and the adjacent centering spring; said auxiliary piston means being movable by the said centering spring at said one end of the cylinder into position between said other motor port and said exhaust port for blocking flow therebetween, and being oppositely movable by pressure sufficient to overcome the force of said spring, to uncover said exhaust port and permit flow of exhaust fluid thereinto while maintaining pressure against said one end of said piston; the said centering spring at the other end of said piston urging said piston toward said one end of said cylinder in opposition to the force on the piston of exhaust fluid in said one end of said cylinder.

9. In combination: a hydraulic motor having two ports and movable through a limited range in response to delivery of fluid to one port and exhaust of fluid from the other port, and a self-holding control valve for said motor, said valve comprising: a valve cylinder and piston; means defining an exhaust passage terminating in exhaust ports communicating with said cylinder adjacent each end thereof, and means defining a pressure port and a pair of motor ports intermediate said exhaust ports; said piston having a plurality of lands sealing with said cylinder, said lands, pressure port, and motor ports being so longitudinally positioned relative to each other that said motor ports are isolated by said lands from said pressure port, and from said ends of said cylinder in a first neutral position of said piston, said pressure port is connected to one motor port, and the other motor port is connected to one end of said cylinder in response to movement of said piston away from neutral in one direction, and said pressure port is connected to the other motor port, and the one motor port is connected to the one end of said cylinder in response to movement of said piston away from neutral in the other direction; spring means for urging the piston into said neutral position comprising a compression spring at each end of said piston; an auxiliary valve piston in each end of said cylinder interposed between said compression springs and opposite ends of said piston, whereby said auxiliary pistons are movable by said springs into positions between said motor ports and the exhaust ports for blocking flow therebetween and are oppositely movable by pressure in the adjacent motor port sufficient to overcome the force of said spring, to uncover said exhaust ports and permit flow of exhaust fluid thereinto while maintaining pressure in the adjacent end of said cylinder against said piston.

10. The combination according to claim 9 in which said valve piston has piston rods extending therefrom at each end through the opposite ends of said valve cylinder in sealing relation therewith; said piston rod has a passage connected to said exhaust passage, and said exhaust ports extend from said passage in said piston rods through the surfaces of said rods.

CLINTON E. DEARDORFF.
ALVIN A. MEDDOCK.

REFERENCES CITED

The following references are of record in the file of this patent:

UNITED STATES PATENTS

| Number | Name | Date |
|---|---|---|
| 1,219,334 | Lower | Mar. 13, 1917 |
| 2,448,532 | Kirkham | Sept. 7, 1948 |
| 2,448,557 | Stephens | Sept. 7, 1948 |